(12) United States Patent
Lai

(10) Patent No.: US 7,334,499 B2
(45) Date of Patent: Feb. 26, 2008

(54) GRIP FOR HANDLEBAR OF BICYCLE

(75) Inventor: Ching-Chuan Lai, Taichung (TW)

(73) Assignee: Bikeforce International Co., Ltd., Taichung (TW)

( * ) Notice: Subject to any disclaimer, the term of this patent is extended or adjusted under 35 U.S.C. 154(b) by 0 days.

(21) Appl. No.: 11/474,805

(22) Filed: Jun. 26, 2006

(65) Prior Publication Data

US 2007/0295150 A1    Dec. 27, 2007

(51) Int. Cl.
 *B62K 21/26*    (2006.01)
(52) U.S. Cl. .................................... 74/551.9
(58) Field of Classification Search ............... 74/488, 74/489, 511.1, 551.9, 551.1; 16/421, 430, 16/431, 436; 81/177.1, 427.5, 489; 403/289, 403/309, 310, 312, 313, 373
See application file for complete search history.

(56) References Cited

U.S. PATENT DOCUMENTS

| | | | | |
|---|---|---|---|---|
| 676,675 | A | * | 6/1901 | Sparling .................... 403/303 |
| 1,179,194 | A | * | 4/1916 | Larie .......................... 384/273 |
| 1,377,101 | A | * | 5/1921 | Sparling .................... 403/313 |
| 2,511,284 | A | * | 6/1950 | Meier ...................... 403/374.3 |
| 4,286,699 | A | * | 9/1981 | Pawelka ..................... 477/209 |
| 5,096,327 | A | * | 3/1992 | Ruland ....................... 403/290 |
| 5,461,936 | A | * | 10/1995 | Bulkeley ..................... 74/489 |
| 6,263,759 | B1 | * | 7/2001 | Hollingsworth et al. ... 74/551.9 |
| 6,588,296 | B2 | * | 7/2003 | Wessel ...................... 74/502.2 |
| 6,681,653 | B2 | * | 1/2004 | Yu ............................. 74/551.9 |
| 6,908,253 | B2 | * | 6/2005 | Harvey ...................... 403/344 |

* cited by examiner

*Primary Examiner*—Vicky A. Johnson
(74) *Attorney, Agent, or Firm*—Alan Kamrath; Kamrath & Associates PA

(57) ABSTRACT

A grip for the handlebar of a bicycle includes an inner tube provided with at least one mounting face and at least one protruding block, at least one flexible clamping member mounted on the mounting face of the inner tube and having two distal ends rested on the protruding block of the inner tube, and at least one locking bolt extended through one distal end of the clamping member and the protruding block and locked in the other distal end of the clamping member to compress the clamping member radially and inwardly. Thus, the metallic handlebar is clamped by the metallic clamping member so that the grip is clamped on the handlebar rigidly and stably, thereby preventing the grip from slipping from the handlebar.

9 Claims, 5 Drawing Sheets

GRIP FOR HANDLEBAR OF BICYCLE

BACKGROUND OF THE INVENTION

1. Field of the Invention

The present invention relates to a grip and, more particularly, to a grip for the handlebar of a bicycle.

2. Description of the Related Art

A grip is mounted on the handlebar of a bicycle to facilitate a rider holding the handlebar. A conventional grip in accordance with the prior art disclosed in U.S. Pat. No. 6,263,759 and comprises an inner tube made of plastic mounted on the handlebar of a bicycle and having at least one end portion provided with two arc-shaped protruding blocks, an outer sleeve made of rubber mounted on the outer wall of the inner tube, a C-shaped clamping member made of metal mounted on the protruding blocks of the inner tube, and an urging bolt extended through the two distal ends of the C-shaped clamping member to compress the C-shaped clamping member which forces the protruding blocks of the inner tube to clamp the handlebar. Thus, the C-shaped clamping member forces the protruding blocks of the inner tube to clamp the handlebar. However, the C-shaped clamping member does not directly compress the handlebar, so that the grip is not clamped on the handlebar rigidly and stably and easily slips from the handlebar.

BRIEF SUMMARY OF THE INVENTION

The primary objective of the present invention is to provide a grip having a closely clamping function.

Another objective of the present invention is to provide a grip, wherein the clamping member is compressed radially and inwardly by the locking bolt to clamp the handlebar, so that the grip is clamped on the handlebar exactly.

A further objective of the present invention is to provide a grip, wherein the metallic handlebar is clamped by the metallic clamping member so that the grip is clamped on the handlebar rigidly and stably, thereby preventing the grip from slipping from the handlebar.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
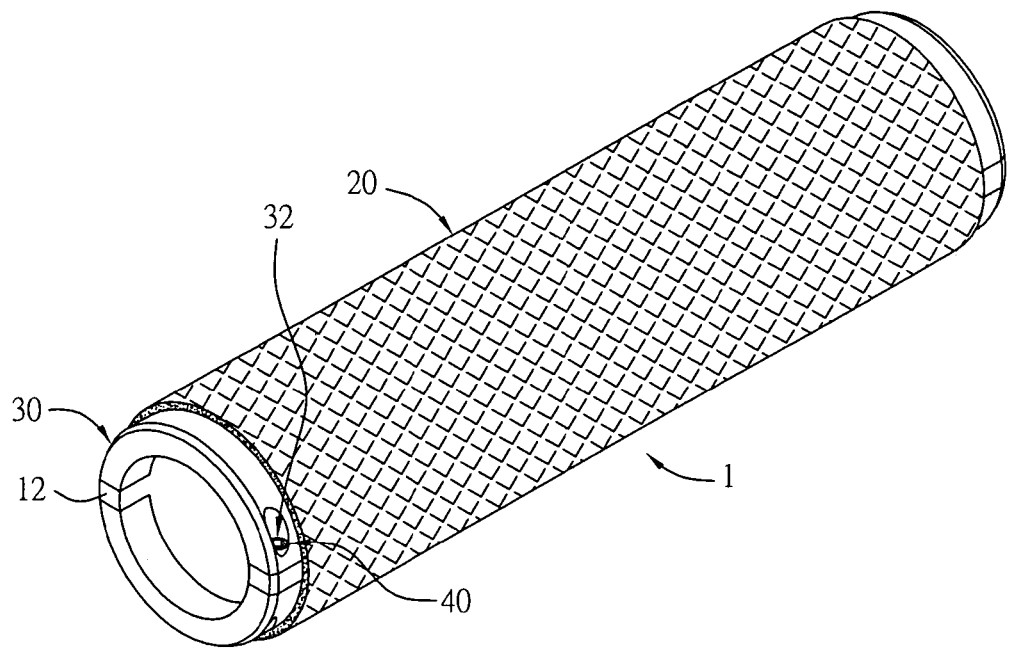
FIG. 1 is a perspective view of a grip in accordance with the preferred embodiment of the present invention.
Figure 2:
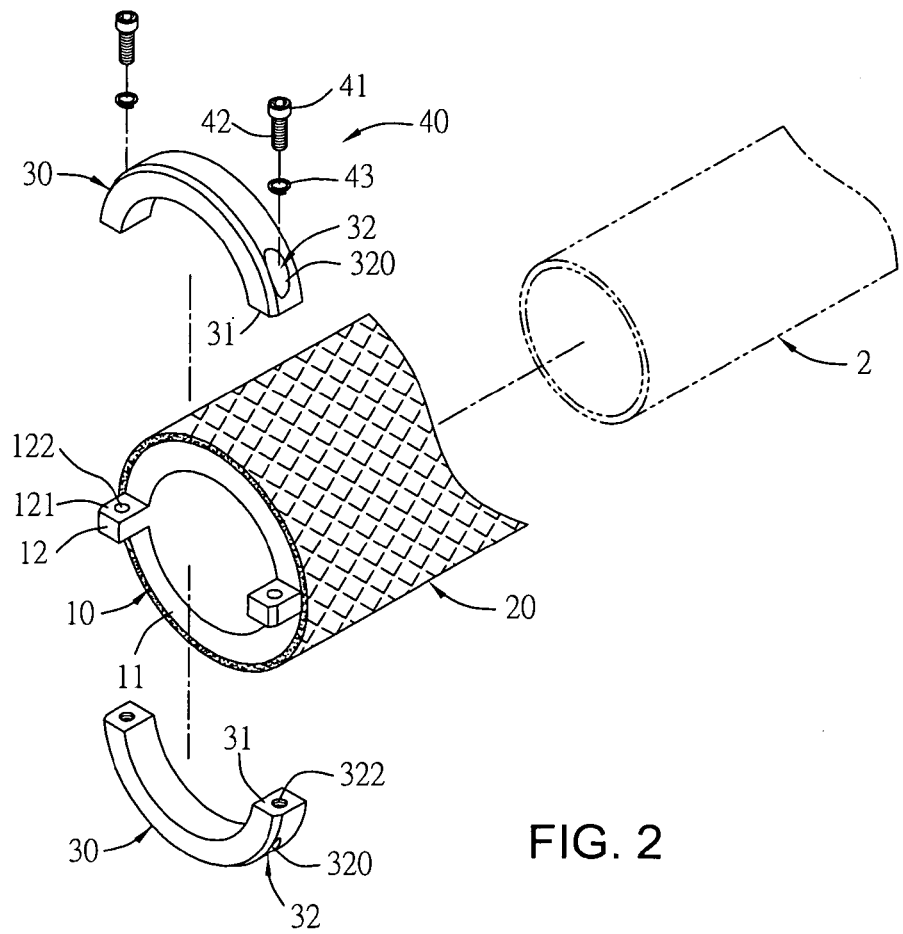
FIG. 2 is a partially exploded perspective view of the grip as shown in FIG. 1.
Figure 3:
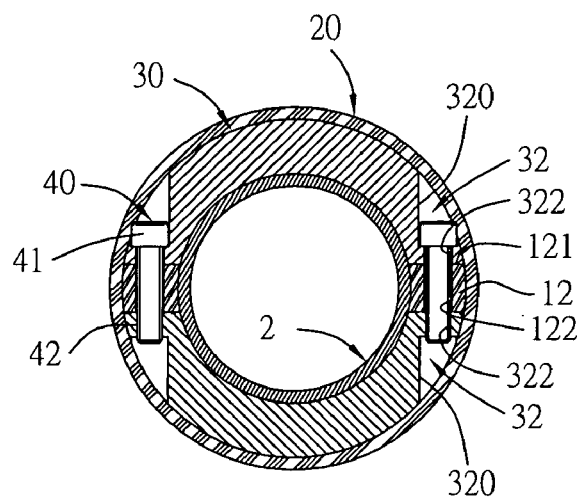
FIG. 3 is a side plan cross-sectional view of the grip as shown in FIG. 1.
Figure 4:
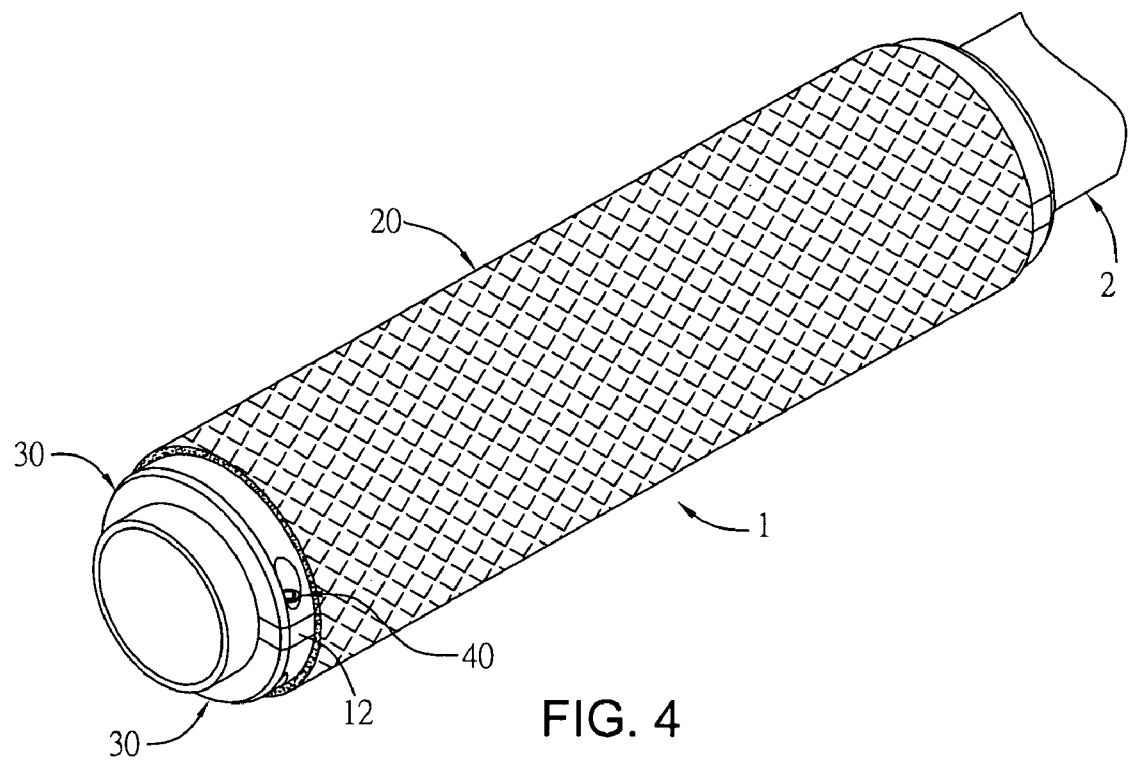
FIG. 4 is a perspective view of the grip for the handlebar of a bicycle as shown in FIG. 1.

Referring to the drawings and initially to FIGS. 1-4, a grip 1 for a handlebar 2 of a bicycle in accordance with the preferred embodiment of the present invention comprises an inner tube 10 mounted on the handlebar 2 of a bicycle and having at least one end portion provided with at least one mounting face 11 and at least one protruding block 12, an outer sleeve 20 made of rubber mounted on an outer wall of the inner tube 10, at least one flexible clamping member 30 mounted on the mounting face 11 of the end portion of the inner tube 10 and having two distal ends rested on the protruding block 12 of the inner tube 10, and at least one locking bolt 40 extended through one of the two distal ends of the clamping member 30 and the protruding block 12 of the inner tube 10 and locked in the other one of the two distal ends of the clamping member 30 to compress the clamping member 30 radially and inwardly so that the clamping member 30 is clamped on an end portion of the handlebar 2.

In the preferred embodiment of the present invention, the inner tube 10 is made of plastic material, and the end portion of the inner tube 10 is provided with two opposite arc-shaped mounting faces 11 and two opposite protruding blocks 12 located between the two mounting faces 11. Each of the protruding blocks 12 of the inner tube 10 has two opposite flat resting faces 121 and has a through hole 122 located between the two resting faces 121.

The grip 1 comprises two opposite arc-shaped clamping members 30 each mounted on the respective mounting face 11 of the inner tube 10 and each having two distal ends each rested on the respective protruding block 12 of the inner tube 10, and two locking bolts 40 each extended through the respective distal end of one of the clamping members 30 and the respective protruding block 12 of the inner tube 10 and each locked in the respective distal end of the other one of the clamping member 30 to compress the clamping members 30 radially and inwardly so that the clamping members 30 are clamped on the handlebar 2.

Each of the clamping members 30 is made of metallic material and has a shape matching that of the respective mounting face 11 of the inner tube 10. Each of the clamping members 30 has two distal ends each provided with a press face 31 rested on the respective resting face 121 of the respective protruding block 12 of the inner tube 10 and each formed with a locking slot 32 connected to the press face 31 to allow passage of the respective locking bolt 40. The locking slot 32 of each of the clamping members 30 has a first portion formed with a screw bore 322 connected to the through hole 122 of the respective protruding block 12 of the inner tube 10 and a second portion formed with a through hole 320 connected to the screw bore 322.

Each of the locking bolts 40 has a bolt head 41 received in the through hole 320 of the respective locking slot 32 of one of the clamping members 30 and a screw portion 42 extended through the through hole 122 of the respective protruding block 12 of the inner tube 10 and screwed into the screw bore 322 of the respective locking slot 32 of the other one of the clamping members 30 to compress the clamping members 30 radially and inwardly so that the clamping members 30 are clamped on the handlebar 2.

The grip 1 further comprises two washers 43 each mounted on the respective locking bolt 40 and located between the bolt head 41 and the screw portion 42 of the respective locking bolt 40.

Figure 5:
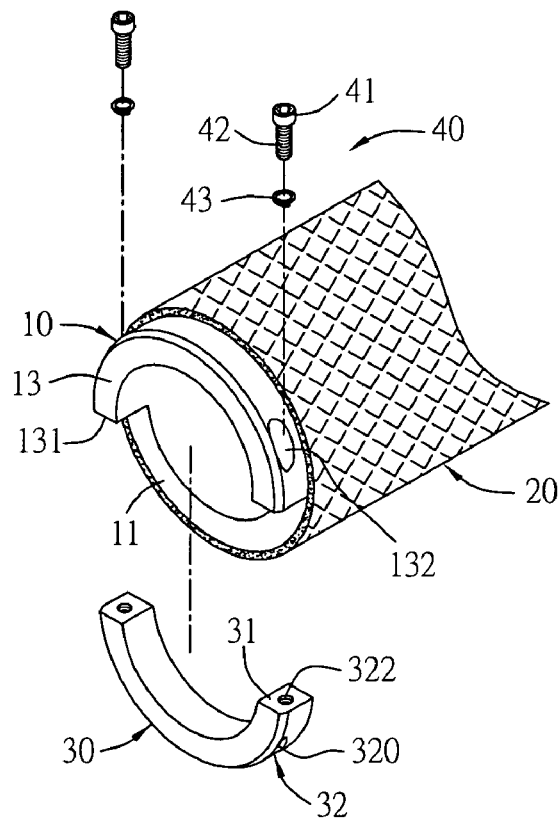
FIG. 5 is a partially exploded perspective view of a grip in accordance with another preferred embodiment of the present invention.

As shown in FIG. 5, the end portion of the inner tube 10 is provided with an arc-shaped mounting face 11 and an arc-shaped protruding block 13 juxtaposed to the mounting face 11. The protruding block 13 of the inner tube 10 has two distal ends each provided with a flat resting face 131 and each formed with a through hole 132 connected to the resting face 131 to allow passage of the respective locking bolt 40.

The grip comprises an arc-shaped clamping member 30 mounted on the mounting face 11 of the inner tube 10 and rested on the protruding block 13 of the inner tube 10, and two locking bolts 40 each extended through the protruding block 13 of the inner tube 10 and locked in the clamping member 30.

The clamping member 30 has a shape matching that of the mounting face 11 of the inner tube 10. The clamping member 30 has two distal ends each provided with a press face 31 rested on the respective resting face 131 of the protruding block 13 of the inner tube 10 and each formed with a locking slot 32 connected to the press face 31 to allow passage of the respective locking bolt 40. The locking slot 32 of the clamping member 30 has a first portion formed with a screw bore 322 connected to the through hole 132 of the respective protruding block 13 of the inner tube 10 and a second portion formed with a through hole 320 connected to the screw bore 322.

Each of the locking bolts 40 has a bolt head 41 received in the through hole 132 of the respective protruding block 13 of the inner tube 10 and a screw portion 42 screwed into the screw bore 322 of the locking slot 32 of the clamping member 30.

Figure 6:
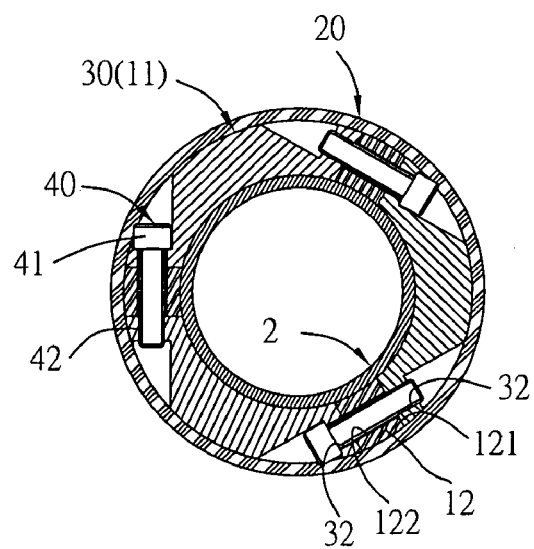
FIG. 6 is a side plan cross-sectional view of a grip in accordance with another preferred embodiment of the present invention.

As shown in FIG. 6, the end portion of the inner tube 10 is provided with three arc-shaped mounting faces 11 and three protruding blocks 12 located between the mounting faces 11, and the grip comprises three arc-shaped clamping members 30 each mounted on the respective mounting face 11 of the inner tube 10 and each having two distal ends each rested on the respective protruding block 12 of the inner tube 10, and three locking bolts 40 each extended through the respective distal end of one of the clamping members 30 and the respective protruding block 12 of the inner tube 10 and each locked in the respective distal end of another one of the clamping member 30 to compress the clamping members 30 radially and inwardly so that the clamping members 30 are clamped on the handlebar 2.

Figure 7:
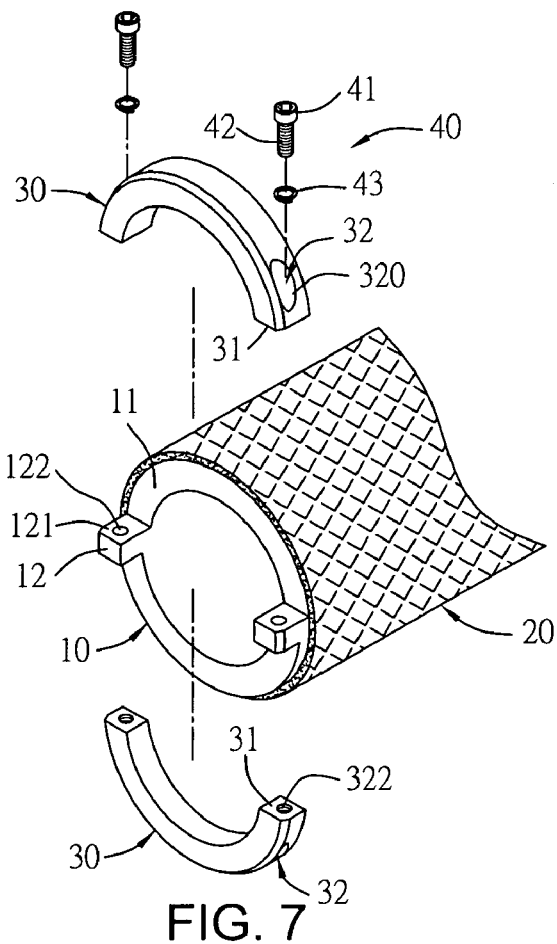
FIG. 7 is a partially exploded perspective view of a grip in accordance with another preferred embodiment of the present invention.

As shown in FIG. 7, the two mounting faces 11 of the inner tube 10 have a height differential to enhance the shear resistant strength of the protruding blocks 12 to resist the torque applied on the grip 1.

Figure 8:
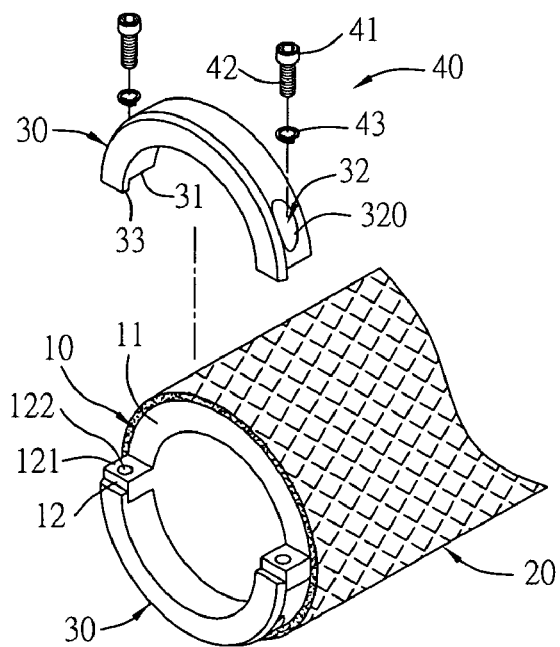
FIG. 8 is a partially exploded perspective view of a grip in accordance with another preferred embodiment of the present invention.

As shown in FIG. 8, each of the clamping members 30 has a top face having a height greater than that of a top face of the respective protruding block 12 of the inner tube 10 and has two distal ends each formed with an extension 33 to encompass the top face of the respective protruding block 12 of the inner tube 10, so that the inner tube 10 is covered by the clamping members 30, thereby enhancing the outer appearance of the grip 1.

Figure 9:
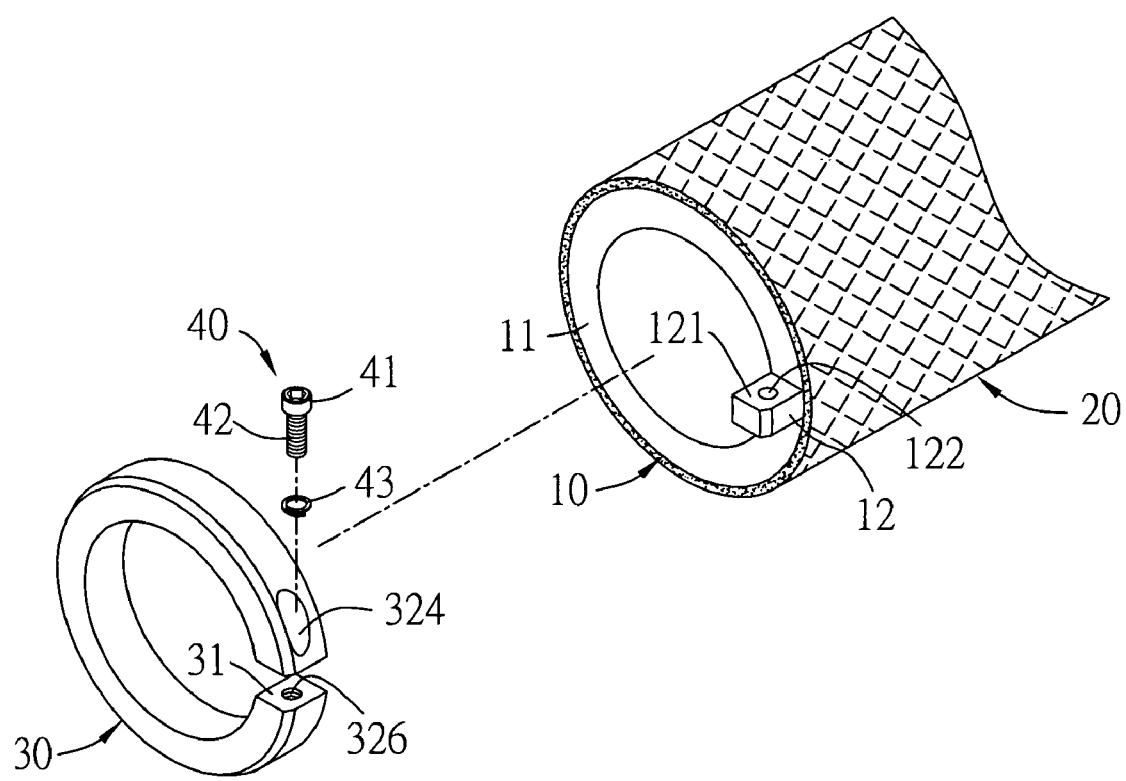
FIG. 9 is a partially exploded perspective view of a grip in accordance with another preferred embodiment of the present invention.

As shown in FIG. 9, the end portion of the inner tube 10 is provided with a C-shaped mounting face 11 and a protruding block 12 juxtaposed to the mounting face 11. The protruding block 12 of the inner tube 10 has two opposite flat resting faces 121 and has a through hole 122 located between the two resting faces 121.

The grip comprises a C-shaped clamping member 30 mounted on the mounting face 11 of the inner tube 10 and rested on the protruding block 12 of the inner tube 10, and a locking bolt 40 extended through a first end of the clamping member 30 and the protruding block 12 of the inner tube 10 and locked in a second end of the clamping member 30.

Each of the first end and the second end of the clamping member 30 is provided with a press face 31 rested on the respective resting face 121 of the protruding block 12 of the inner tube 10. The first end of the clamping member 30 is formed with a through hole 324, the second end of the clamping member 30 is formed with a screw bore 326, and the locking bolt 40 has a bolt head 41 received in the through hole 324 of the clamping member 30 and a screw portion 42 extended through the through hole 122 of the protruding block 12 of the inner tube 10 and screwed into the screw bore 326 of the clamping member 30.

Accordingly, the clamping member 30 is compressed radially and inwardly by the locking bolt 40 to clamp the handlebar 2, so that the grip is clamped on the handlebar 2 exactly. In addition, the metallic handlebar 2 is clamped by the metallic clamping member 30 so that the grip is clamped on the handlebar 2 rigidly and stably, thereby preventing the grip from slipping from the handlebar 2.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A grip, comprising:
   an inner tube having at least one end portion provided with at least one mounting face and at least one protruding block;
   at least one flexible clamping member mounted on the mounting face of the end portion of the inner tube and having two distal ends rested on the protruding block of the inner tube;
   at least one locking bolt extended through one of the two distal ends of the clamping member and the protruding block of the inner tube and locked in the other one of the two distal ends of the clamping member to compress the clamping member radially and inwardly;
   wherein:
   the end portion of the inner tube is provided with two opposite arc-shaped mounting faces and two opposite protruding blocks located between the two mounting faces;
   the grip comprises two opposite arc-shaped clamping members each mounted on the respective mounting face of the inner tube and each having two distal ends each rested on the respective protruding block of the inner tube, and two locking bolts each extended through the respective distal end of one of the clamping members and the respective protruding block of the inner tube and each locked in the respective distal end of the other one of the clamping member.

2. The grip in accordance with claim 1, wherein:
   each of the protruding blocks of the inner tube has two opposite flat resting faces and has a through hole located between the two resting faces;

each of the two distal ends of each of the clamping members is provided with a press face rested on the respective resting face of the respective protruding block of the inner tube and formed with a locking slot connected to the press face to allow passage of the respective locking bolt.

3. The grip in accordance with claim 2, wherein:
the locking slot of each of the clamping members has a first portion formed with a screw bore connected to the through hole of the respective protruding block of the inner tube and a second portion formed with a through hole connected to the screw bore;
each of the locking bolts has a bolt head received in the through hole of the respective locking slot of one of the clamping members and a screw portion extended through the through hole of the respective protruding block of the inner tube and screwed into the screw bore of the respective locking slot of the other one of the clamping members.

4. The grip in accordance with claim 3, further comprising two washers each mounted on the respective locking bolt and located between the bolt head and the screw portion of the respective locking bolt.

5. The grip in accordance with claim 1, wherein the two mounting faces of the inner tube have a height differential to enhance a shear resistant strength of the protruding blocks.

6. The grip in accordance with claim 1, wherein each of the clamping members has a top face having a height greater than that of a top face of the respective protruding block of the inner tube and has two distal ends each formed with an extension to encompass the top face of the respective protruding block of the inner tube, so that the inner tube is covered by the clamping members.

7. The grip in accordance with claim 1, wherein the clamping member is made of metallic material.

8. The grip in accordance with claim 1, wherein the clamping member has a shape matching that of the mounting face of the inner tube.

9. The grip in accordance with claim 1, wherein each of the clamping members has a shape matching that of the respective mounting face of the inner tube.

* * * * *